Jan. 22, 1963 S. R. HOTARD 3,074,102
CARCASS SPLITTING MACHINE
Filed Dec. 11, 1959 2 Sheets-Sheet 1

INVENTOR.
SEPTIME R. HOTARD,
BY
McMorrow, Berman & Davidson
ATTORNEYS.

Jan. 22, 1963 S. R. HOTARD 3,074,102
CARCASS SPLITTING MACHINE
Filed Dec. 11, 1959 2 Sheets-Sheet 2
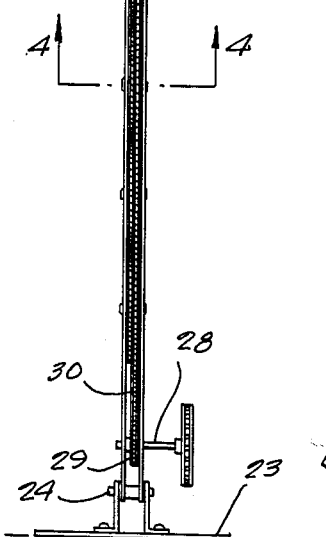
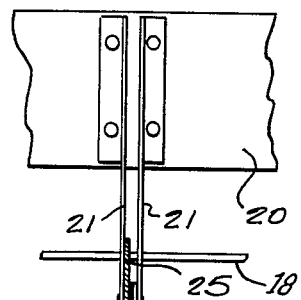
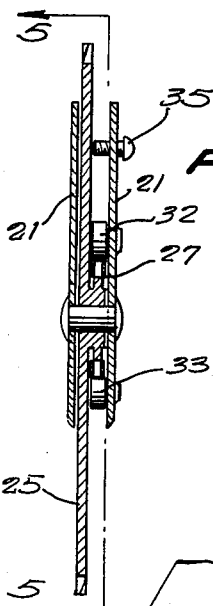
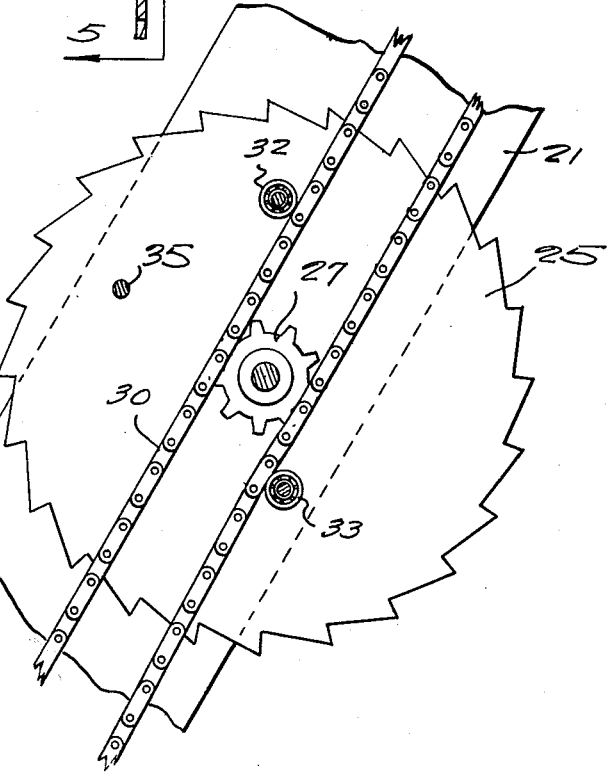
INVENTOR.
SEPTIME R. HOTARD,
BY
McMorrow, Berman & Davidson
ATTORNEYS.

United States Patent Office 3,074,102
Patented Jan. 22, 1963

3,074,102
CARCASS SPLITTING MACHINE
Septime R. Hotard, Gainesville, Fla., assignor of one-fourth to O. L. Durrance and one-fourth to Mary E. Jenkins, both of Gainesville, Fla.
Filed Dec. 11, 1959, Ser. No. 858,884
4 Claims. (Cl. 17—23)

This invention relates to butchering apparatus, and more particularly to an apparatus for splitting a carcass vertically while the carcass is being moved along an overhead support.

A main object of the invention is to provide a novel and improved carcass splitting machine which is simple in construction, which is easy to operate, and which provides a rapid and efficient means for splitting a carcass vertically with a minimum amount of human labor.

A further object of the invention is to provide an improved carcass splitting apparatus which involves inexpensive components, which is durable in construction, which operates to cut a carcass into two segments in a neat, efficient and accurate manner, substantially along a designated vertical line on the carcass, for example, the vertical central line of the carcass, and which is arranged so that the carcass may be thus severed in a rapid and efficient manner.

Further objects and advantages of the invention will become apparent from the following description and claims, and from the accompanying drawings, wherein:

FIGURE 3 is a fragmentary elevational view taken substantially on the line 3—3 of FIGURE 2.

FIGURE 4 is an enlarged horizontal cross sectional view taken substantially on the line 4—4 of FIGURE 3.

FIGURE 5 is a vertical cross sectional view taken on the line 5—5 of FIGURE 4.

Figure 1:
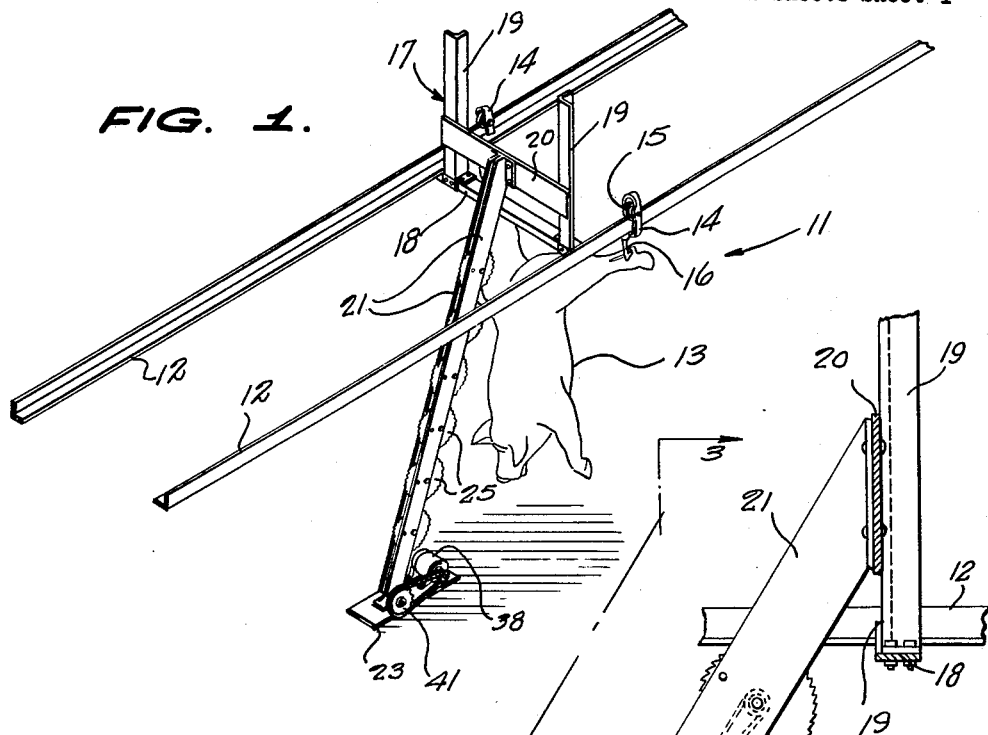
FIGURE 1 is a perspective view of a carcass splitting apparatus according to the present invention, showing the manner in which a carcass is moved against the cutting member of the apparatus.

Referring to the drawings, 11 generally designates an improved carcass-splitting apparatus constructed in accordance with the present invention. The apparatus 11 comprises a pair of spaced parallel supporting rails 12, 12 which are of any suitable cross sectional shape, for example, which are of rightangled cross sectional shape, as specifically illustrated in FIGURE 1. The rails 12, 12 are adapted to support a carcass 13 for movement therealong, for example, by means of a pair of carriage members 14, 14 engaged on the top edges of the vertical flanges of the track members 12, 12, the carriage members being provided with suitable rollers 15 so that they may move easily along the track members. Each carriage member is provided with a depending hook 16 adapted to be engaged in a hind leg of the carcass in the manner illustrated in FIGURE 1, so that the carcass will be suspended vertically between the rail members 12, 12 in the manner illustrated in FIGURE 1.

The rail members 12, 12 may be suitably inclined so that the carcass 13 will move along the rail members by gravity in a direction from the right to the left, as viewed in FIGURE 1.

Designated generally at 17 is a frame mounted transverse to the rails 12, 12, and comprising, for example, a bottom cross bar 18 secured to the under sides of the bottom flanges of the rails and being also secured to vertical supporting posts 19, 19 which may be connected to a suitable supporting member, not shown, located above the rail members 12, 12. Transversely secured to the vertical posts 19, 19 is a plate member 20. The post members 19, 19 are spaced inwardly sufficiently with respect to the vertical flanges of the track members 12, 12, to provide the required clearance for the carriage members 14, 14, whereby the carriage members may move past the post members 19, 19 without interference therefrom.

Designated at 21, 21 are a pair of relatively close spaced, parallel, elongated, relatively flat bar members which are secured at their top ends to the mid portion of the transverse vertical plate member 20 and which extend downwardly and forwardly therefrom in respective longitudinal vertical planes spaced symmetrically on opposite sides of the longitudinal vertical center plane of the parallel rails 12, 12. The bottom ends of the elongated flat bar members 21, 21 are connected by a suitable bracket member 22 to a horizontal base plate 23 which may be secured to the floor in any suitable manner. The bars 21, 21 are preferably pivotally connected at 24 to the upstanding bracket member 22, said bars or bar members being received between the upper ends of the bracket member, whereby the structure may be readily adjusted to the slope of the floor when the device is installed.

Designated at 25 are a plurality of circular saw blades which are journaled between the flat elongated bar members 21, 21 in closely spaced relationship along said bar members, the inclination of the bar members 21, 21 being sufficient so that the blades may be located so as to define a substantially continuous cutting edge assemblage with respect to a forwardly moving carcass 13 when the carcass is advanced against the rotating circular saw blades 25.

Each saw blade is integrally formed with a sprocket wheel 27. Journaled in the lower end portions of the spaced parallel flat bar members 21, 21 is a transverse shaft 28 on which is mounted a sprocket wheel 29 substantially coplanar with the sprocket wheels 27 on the respective circular saw blades 25. An endless sprocket chain 30 engages around the sprocket wheels 27 and the drive sprocket 29, so that the circular saw blades 25 are positively driven responsive to rotation of the shaft 28.

As shown in FIGURE 4, the bar member 21 adjacent the sprocket wheels 27 is preferably provided with spaced upper and lower guide rollers 32, 33 supportingly engageable with the top and bottom portions of the sprocket chain 30 to guide the chain and to support said chain in driving engagement with the respective sprocket wheels 27. Said bar member 21 may be likewise provided above the sprocket wheels with stop screws 35 which are located so as to be engageable with the upper portions of the circular saw blades 25 and to prevent tilting of the saw blades.

Mounted on the supporting plate member 23 is an electric motor 38 whose shaft is provided with a driving sprocket wheel 39. The sprocket wheel 39 is coupled by a sprocket chain 40 to a larger sprocket wheel 41 secured on the outer end of the transverse driving shaft 28, whereby torque is transmitted from the electric motor 38 to the circular saw blades 25 through the chain 40, the sprocket wheel 41 and the driving shaft 28. Thus, the circular blades 25 are rotated simultaneously responsive to rotation of the driving shaft 28 because of the positive coupling provided between the driving shaft sprocket wheel 29 and the sprocket wheels 27 formed integrally with the circular saw blades 25.

In operation, as a carcass moves along the rails 12, 12, the carcass comes into contact with the rotating circular saw blades 25 and is thus split vertically by the saw blades, whereby the carcass is divided into two segments, each segment being thereafter supported by its hook 16 on a rail 12.

Figure 2:
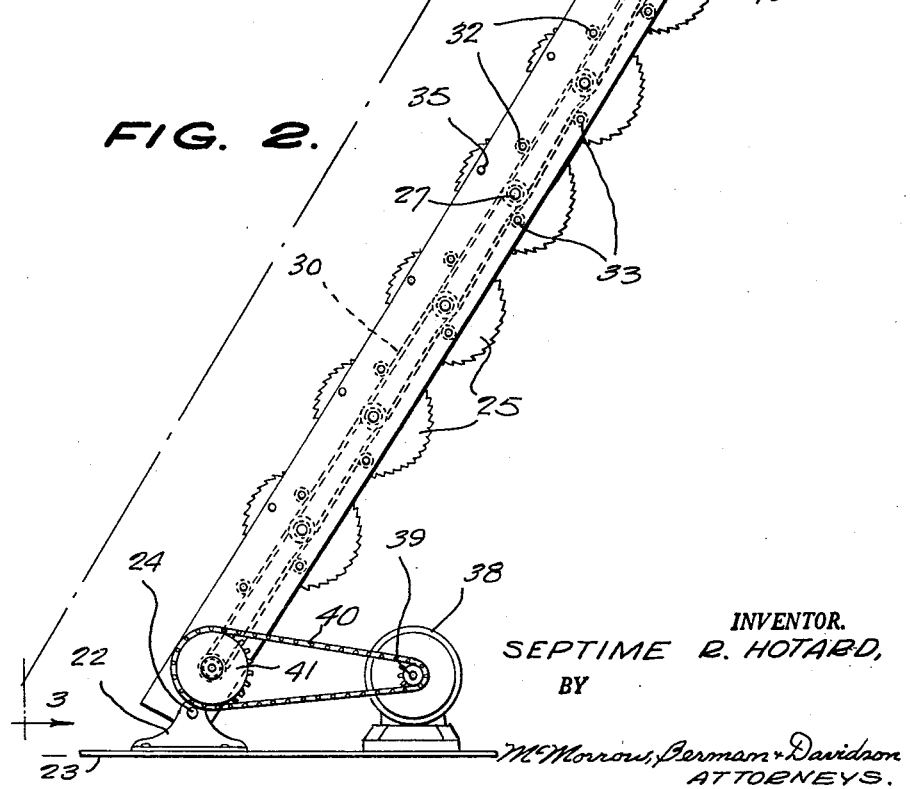
FIGURE 2 is an enlarged longitudinal vertical cross sectional view taken through a portion of the transverse frame member of the apparatus of FIGURE 1 and showing the cutting member thereof in side elevational view.

As above described, and as shown in FIGURE 2, the circular blades 25 are spaced sufficiently closely together to define a substantially continuous assemblage of cutting blade elements presented to the carcass as it is moved against the rotating blades, since the bar members 21, 21 are inclined sufficiently to provide the required overlapping of the saw blades to present the aforementioned substantially continuous vertical cutting blade assemblage.

As is clearly shown in FIGURES 2 and 5, the circular saw blades 25 are journaled between the flat bar members 21, 21 at locations adjacent the bottom edges of the bar members 21, so that the circular saw blades project substantial distances outwardly from between the flat bar members 21, 21 in a direction toward the frame 17. Thus, relatively large portions of the circular saw blades 25 are exposed to the approaching carcass 13, insuring that the upper portion of the carcass will be adequately sawed to allow the lower portion thereof to be engaged by the lower circular saw blades as the carcass moves past the bar members 21.

While a specific embodiment of improved carcass-splitting apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for cutting carcasses vertically comprising a pair of spaced parallel supporting rails adapted to support a carcass for movement therealong, a frame mounted transverse to said rails, a pair of relatively closely spaced parallel elongated relatively flat bar members secured to said frame between said rails and extending downwardly from said frame in vertical planes parallel to said rails, a plurality of circular saw blades journaled between said flat bar members and projecting outwardly therefrom toward said frame, drive means coupled to said blades and being constructed and arranged to simultaneously rotate said blades, and inwardly projecting stop screws on the flat bar members engageable with the upper portions of the saw blades to prevent tilting of the saw blades.

2. A device for cutting carcasses vertically comprising a pair of spaced parallel supporting rails adapted to support a carcass for movement therealong, a frame mounted transverse to said rails, a pair of relatively closely spaced parallel elongated relatively flat bar members secured to said frame between said rails and extending downwardly from said frame in vertical planes parallel to said rails, a plurality of circular saw blades journaled between said flat bar members and projecting outwardly therefrom toward said frame, a supporting plate pivotally connected to the lower ends of said flat bar members and being adapted to engage the floor beneath the supporting rails and to angle in accordance with the slope of the floor, a drive shaft journaled between the lower end portions of said flat bar members, means coupling said drive shaft to the saw blades, an electric motor mounted on said supporting plate, and means drivingly coupling said motor to said drive shaft.

3. A device for cutting carcasses vertically comprising a pair of spaced parallel supporting rails adapted to support a carcass for movement therealong, a frame mounted transverse to said rails, a pair of relatively closely spaced parallel elongated relatively flat bar members secured to said frame between said rails and extending downwardly from said frame in vertical planes parallel to said rails, a plurality of circular saw blades journaled between said flat bar members and projecting substantial distances outwardly therefrom toward said frame, a supporting plate pivotally connected to the lower ends of said flat bar members and being adapted to engage the floor beneath the supporting rails and to angle in accordance with the slope of the floor, a drive shaft journaled between the lower end portions of said flat bar members, respective sprockets on the drive shaft and the blades, an endless sprocket chain engaged on and drivingly coupling said sprockets, an electric motor mounted on said supporting plate, and means drivingly coupling said motor to said drive shaft.

4. A device for cutting carcasses vertically comprising a pair of spaced parallel supporting rails adapted to support a carcass for movement therealong, a frame mounted transverse to said rails, a pair of relatively closely spaced parallel elongated relatively flat bar members secured to said frame between said rails and extending downwardly from said frame in vertical planes parallel to said rails, a plurality of circular saw blades journaled between said flat bar members and projecting substantial distances outwardly therefrom toward said frame, a supporting plate pivotally connected to the lower ends of said flat bar members and being adapted to engage the floor beneath the supporting rails and to angle in accordance with the slope of the floor, a drive shaft journaled between the lower end portions of said flat bar members, respective sprockets on the drive shaft and the blades, an endless sprocket chain engaged on and drivingly coupling said sprockets, an electric motor mounted on said supporting plate, means drivingly coupling said motor to said drive shaft, and inwardly projecting stop screws on the flat bar members engageable with the upper portions of the saw blades to prevent tilting of the saw blades.

References Cited in the file of this patent

UNITED STATES PATENTS

| | | |
|---|---|---|
| 910,614 | Wallwork | Jan. 26, 1909 |
| 2,653,000 | Cadwell et al. | Sept. 22, 1953 |